United States Patent Office 3,488,203
Patented Jan. 6, 1970

3,488,203
BINDING AGENT
Lennart Andersson, Saltsjo-Boo, Sweden, assignor to Aktiebolaget Stra Kalkbruk, Stockholm, Sweden
No Drawing. Continuation of application Ser. No. 358,093, Apr. 7, 1964. This application July 8, 1968, Ser. No. 744,618
Int. Cl. C04b 7/20, 7/16
U.S. Cl. 106—117        4 Claims

ABSTRACT OF THE DISCLOSURE

A method of producing a binding agent, particularly for masonry and finishing mortars, and comprising a mixture of ground blast furnace slag and slaked lime, which involves: (a) separately grinding the blast furnace slag to a particle size having a surface area of at least 4,000 cm.$^2$/g., (b) admixing the ground blast furnace slag with slake lime having a grain size such that the surface area is at least 12,000 cm.$^2$/g., and (c) subjecting the admixture of step (b) to a further grinding operation.

RELATED CASE

This application is a continuation of prior application Ser. No. 358,093 filed Apr. 7, 1964, now abandoned.

For mechanical strength reasons, a cementing or binding agent incorporating cement presently finds extensive use for masonry and finishing mortars instead of pure hydrated lime. Generally this binding agent consists of a mixture of cement and hydrated line in proportions determined by mechanical strength desired for the mortar. In the official publication "Anvisningar till Byggnadsstadgan" (Sweden), mortar is classified according to the cement content of its binding agent into Classes A to D. For Class-A mortar the binding agent contains 90% cement by weight, for Class-B mortar 65% cement by weight, for Class-C mortar 50% cement by weight, and for Class-D mortar solely lime. The respective binding agents are mixed in the proportions of 1 part binding agent to 4 parts sand by volume. The length of time for which a cement-containing mortar can be used after its preparation without its mechanical strength being impaired, is determined by the setting time of the cement contained. This time, for normal cement grades, is very short, being, as a rule, no longer than 2 to 4 hours, and after this time period having elapsed the mortar must no longer be used. This circumstance has made it necessary, as a rule, to prepare masonry and finishing mortars containing cement on the site and in small successive quantities. Since satisfactory arrangement for proportioning mortar ingredients generally are not available on the building sites, considerable uncertainty will arise as to the quality of the mortar prepared. For this reason, it has long been desired to make available a binding agent for masonry mortar, as well as for finishing mortar, which unites with the mechanical strength of the cement-containing binding agents a setting time of a length which is sufficiently extended to enable the mortar to be produced, as a rule, in mortar factories, thereby ensuring a uniform and high quality of the mortar.

As binding agents for masonry and finishing mortars, it has been proposed also to use mixtures of finely ground blast furnace slag and slaked lime. Such binding agents are produced by grinding crushed or granulated blast furnace slag and hydrated lime with minor additions of setting-time controlling substances, such as gypsum, together in a suitable mill, such as a ball mill of the tube-mill type. In this process, the slaked lime (or calcium hydroxide) has to be added in sufficient amounts to impart to the mortar prepared with the binding agent concerned the desired plasticity. About 50% slaked lime by weight would be required for this purpose. When using slag from Swedish blast furnaces, this slag having a relatively lower calcium-content than certain blast furnace slags in other countries, a binding agent is obtained which results in a mortar having a mechanical strength only slightly higher than that of conventional sand-lime mortar. Even when preparing the binding agent from foreign blast-furnace slags having a higher calcium-oxide content, slaked lime will have to be added in such high amounts in order to impart a desirable plasticiity to the finally prepared masonry or finishing mortar, that this mortar will have a mechanical strength which is lower than that of a lime-cement mortar of the same lime content. The setting time in both cases will be too short to enable the mortar to be produced at mortar factories.

The present invention has for its object to provide a binding agent consisting of a mixture of ground blast furnace slag and slake lime which is particularly adapted to use in high-grade masonry and finishing mortars and has a setting time of sufficient length to enable the mortar to be factory-produced in large batches. In this connection, a mechanical strength of the binding agent is aimed at which is at least equal to that of a binding agent consisting of a mixture of 50% slaked lime and 50% cement by weight. This, as a matter of fact, is the minimum strength requirement for a novel binding agent to be of any commercial interest. In other words: in mixture with sand the novel binding agent should result in a mortar meeting the requirements according to Class C.

The invention is based on a realization of the fact that the setting of a binding agent of the kind concerned depends on a chemical reaction between the blast furnace slag and the slaked or hydrated lime, and that this reaction will be enhanced if the blast furnace slag is extremely finely ground. Hydrated or slaked lime, as a rule, has a grain size, in terms of specific surface area according to Blaine, of at least about 12,000 cm.$^2$/g., and it has been found to be suitable to grind the blast furnace slag down to a particle size corresponding to a specific surface area of at least about 4,000 cm.$^2$/g., preferably 6,000 to 7,000 cm.$^2$/g. or more. Such a fine grinding of the blast furnace slag cannot be carried out in mixture with the slaked lime, because the lime particles are soft and would form a kind of lubricant, wherefore the fine-grinding of the blast furnace slag will have to be performed in separate grinding operation. A binding agent obtained by mixing extremely finely ground blast furnace slag with slaked lime will result in a mechanical strength of a mortar produced therefrom which will be higher than that of a mortar containing a binding agent produced in the conventional way by grinding crushed or granulated blast furnace slag together with slaked lime, but the strength increase obtained will not be particularly pronounced. Further, the setting time of uniformly mixed product will only be 3 to 4 hours, as measured according to the method described in the official publication of standards "Murcementnormer," of 1960 (Sweden), and this setting time is much too short to enable factory production of mortar in large batches.

In accordance with the present invention a very substantial increase of the mechanical strength and a very important extension of the setting time have been realized in a surprisingly simple way, namely by intimately mixing previously finely ground blast furnace slag and slaked lime by forcefully grinding these ingredients together. This co-grinding cannot be expected to result in any further reduction of the particle size of the blast furnace slag, but will force the blast furnace slag particles and the slaked lime particles into intimate contact with each other, thereby establishing the required conditions for a more intense chemical reaction between the particles in the pressure of water. A still more fact, however, is that the co-grinding with the lime results in a considerable extension of the length of the setting time. It has been found that a co-grinding of the mixture components, being already of a sufficient fineness, may result in a strength increase of the order of 50 to 100%, and in an extension of the setting time by a multiple of 3 to 5, which is more than enough to enable the production of a masonry or finishing mortar having an allowable storage time of sufficient length to enable the mortar advantageously to be produced at a mortar factory.

In a manner known per se, the binding agent may, of course, be added to it a small quantity of gypsum or other substances adapted to extend the setting time. The gypsum could suitably be added to the basic components in conjunction with their grinding together, and possibly in a pre-comminuted form.

The significance of the co-grinding in respect to mechanical strength and setting time of the cementing agent will appear from the following description of tests which have been carried out.

A blast furnace slag coming from a Swedish ironworks and containing about 35% CaO by weight was ground separately down to a particle size, in terms of specific surface area according to Blaine, of 6,200 cm.$^2$/g. The grinding energy required to accomplish this work was measured in terms of kwh./ton. The final ground blast furnace slag was uniformly mixed with an equal quantity by weight of dry-slaked lime having a specific surface area of about 12,500 cm.$^2$/g., as well as with a small amount, about 3 to 5%, of fine-pulverized gypsum. The major portion of the mixture thus obtained was subjected to co-grinding in the same mill in which the separate grinding of the blast furnace slag had been carried out. For a first batch, the co-grinding operation was effected up to a point, at which the co-grinding energy in terms of kwh./ton was measured to 35% of the grinding energy consumed in the preparatory fine-grinding of the blast furnace slag, while, for the second batch, the co-grinding operation was driven still further, namely up to a point at which the grinding energy consumed was measured to 65% of the first-mentioned value. From the three separate batches of the binding agent a plurality of test specimens or samples were prepared, and these were subjected to testing in respect of resistance to compression and bending forces at different ages. The results of these tests are specified in the table below:

Thus it has been found possible in actual practice to make up a mortar after 24 hours where the setting time of the binding agent, as measured in the manner indicated hereabove, amounts to 10 hours, with no essential strength reduction. Thus, mortar produced with the binding agent of the present invention may be prepared one day and used up the day after, it being possible then, without any detraction from strength requirements, to make it up with water to the proper consistency. Therefore, the binding agent of the invention is well suited for use in production of mortar at mortar factories or at centralized mixer stations and obviates the practical centralized preparation localities, thereby ensuring a substantially increased safety as to the quality of the mortar when used on the site. Also in cases where the mortar has to be prepared on the site, because no mortar factories are present in the district concerned, the use of the binding agent according to the invention will afford a higher degree of security as regards the mortar quality, because it is possible to prepare larger batches thereof, in that mortar remaining over from the day of preparation can be used the day after with no noticeable detraction from the mechanical strength of the masonry.

The working characteristics of a mortar prepared with the binding agent of the invention would be best estimated entirely practically by experienced masons or bricklayers. Experienced masons which have been given an opportunity to try masonry and finishing mortar containing the binding agent of the invention are of the opinion that mortar thus produced is considerably superior, as to its workability, to mortar with a binding agent consisting of lime and cement. Even a comparison with pure sandlime mortar turns out to the favour of the novel binding agent, because in plastering work, from the point of view of handicraft, the surfaces obtained will present a better finish than when using pure sand-lime mortar. As a consequence of the considerably longer setting time as compared with cement-containing mortars, a simpler and faster performing of the manual work will be possible. Thus, in performing plastering work the various steps may be carried out one after the other, since it is no longer equally important to watch the correct points of time as in the case of plastering using cement-containing, rapid-setting mortars or finishing mortars or plasters.

Although the binding agent of the invention is particularly suitable for use in masonry and plaster mortars, it could also, to advantage, be used for other construc- TABLE 1.—STRENGTH OF SPECIMENS IN KP./CM.$^2$ ACCORDING TO MORTAR-CEMENT STANDARDS

| Age of specimen in days | Co-grinding energy in kwh./ton | | | | | |
| --- | --- | --- | --- | --- | --- | --- |
| | 0% | | 35% | | 65% | |
| | Compressive strength | Tensional bending | Compressive strength | Tensional bending | Compressive strength | Tensional bending |
| 3 | 29.4 | 13.9 | 38.1 | 16.9 | 54.2 | 19.8 |
| 7 | 61.6 | 22.2 | 81.2 | 29.5 | 106.2 | 33.7 |
| 14 | 76.6 | 23.5 | 131.0 | 36.4 | 137.5 | 38.1 |
| 28 | 100.9 | 33.2 | 141.5 | 42.2 | 166.9 | 43.9 |
| 56 | 116.8 | 40.0 | 161.2 | 47.4 | 188.6 | 48.8 |

Further, the setting time was measured according to the method described in the "Murcementnormer" above referred to. The setting time was found to be for:

| | Hours |
| --- | --- |
| The product simply mixed homogeneously | 3–4 |
| Co-ground product with 35% energy consumption | 7–8 |
| Co-ground product with 65% energy consumption | 10–12 |

It is seen from this account of tests carried out that it is possible by such co-grinding with a relatively moderate energy consumption to attain a substantial increase of the mechanical strength of the binding agent, as well as extension of its setting time up to 10 hours and more. Concomitantly a reduction in setting rate will occur.

tional purposes. Thus it may be used as a binding agent for building stones and slabs, as a binding agent in wood insulating boards and like products, such as blocks and slabs or other constructional elements reinforced with organic or inorganic fibre materials. Furthermore, the binding agent may be used for ground stabilization in which case its extended setting time will eliminate many practical problems.

The relative amount of slaked lime contained in the binding agent may be varied within wide limits. Determinative in this respect is primarily the chemical composition of the blast furnace slag used, further the particle size of the finely ground slag, and the mechanical strength it is desired to attain. As a rule, the binding agent should contain at least 10% and at most 70% of slaked lime by weight. Lime used in excess in the production of masonry and finishing mortar will impart, as already mentioned, increased workability or plasticity to the mortar, but will cause a certain reduction of the mechanical strength. The optimum strength, where binding agents produced with blast furnace slag from Swedish ironworks are concerned, would be obtained if the binding agent contains about 25% of lime by weight. In cases where excess lime is required in order to impart a desired plasticity and workability to the mortar, it would be possible to grind the finely divided blast furnace slag together with a portion of the overall quantity of lime, and to add the remaining portion of the lime in conjunction with the preparation of the mortar. However, a safer proportioning will be attained if the total amount of lime required is allowed to be incorporated in the binding agent, thus being subjected to grinding together with the previously finely ground blast furnace slag.

To further illustrate the advantageous characteristics of the novel binding agent, a number of practical tests will be described hereinafter.

To the end of practically manifesting the possibility of using a mortar containing the binding agent according to the invention during long time periods, i.e. the possibility of "making up" the mortar, the following test series was carried out. A quantity of mortar was produced in the morning of the 1st day. A series of brick columns 25 x 25 cm. in square and about 1 m. in height were built up immediately, and 2 hours and 5 hours respectively after the mortar was prepared. The mortar was then left standing overnight and was made up in the morning of the 2nd day. A further series of brick columns were built up in the morning and at noon, 22 and 26 hours, respectively, after the mortar was prepared. At the ages of 7 and 28 days the columns were subjected to compressive testing. The results are specified in the table below.

From this it will be seen that the time of usability, i.e. the time during which the mortar may be used without any reduction in strength, exceeds 24 hours.

When plastering or finishing with mortar produced with the binding agent according to the invention, it has been found possible to make up the mortar even on the 3rd and 4th day without any detraction from the quality of the plaster.

At the National Physical Laboratory of Sweden a similar test series has been carried out and will be described hereinafter in conjunction with presenting strength specifications.

The binding agent of the invention imparts to mortar produced therefrom a mechanical strength which, with a broad margin, complies with the requirements of Classes B and C in the Official publication "Anvisningar till Byggnadsstadgan" (or: "BABS") referred to hereinbefore, p. 75, Table 16:1. The mechanical strength of mortar is measured: (1) as the strength of built up brick columns, as compared to mortar according to BABS, and (2) by testing, in applicable respects, according to the Official publication "Murcementnormerna" of 1960. Tables 3 and 4 specify such series. The bricks used were solid bricks having a mechanical strength of approximately 300 kp./cm.$^2$, as determined according to the official standards for bricks "Murtegelnormer" of 1955 (Sweden).

TABLE 3

| Mortar | Class | Ratio of lime to cement by weight | Parts of binding agent to 100 parts of sand | Binding agent to sand: ratio Parts by volume | Binding agent to sand: ratio Parts by weight | Strength in kp./cm$^2$ after— 7 days | Strength in kp./cm$^2$ after— 28 days | Strength in kp./cm$^2$ after— 56 days |
|---|---|---|---|---|---|---|---|---|
| Lime-cement mortar | A | 10:90 | 23.1 | 1:4 | | 112 | | 128 |
| | B | 36:65 | 18.9 | 1:4 | | 90 | 100 | 100 |
| | C | 50:50 | 16.7 | 1:4 | | 70 | 83 | 93 |
| | | 50:50 | 13.3 | 1:5 | | 51 | 77 | 92 |
| Mortar with the novel binding agent | | | 22.2 | 1:3 | 1:4.5 | 103 | 120 | 140 |
| | | | 16.7 | 1:4 | 1:6 | 95 | 115 | 125 |
| | | | 13.3 | 1:5 | 1:7.5 | 94 | 118 | 120 |
| | | | 11.1 | 1:6 | 1:9 | 74 | 90 | 114 |

TABLE 2

| Age of mortar, hours | Strength in kp./cm.$^2$ of columns built up after 7 days | Strength in kp./cm.$^2$ of columns built up after 28 days |
|---|---|---|
| At building up: | | |
| 0 | 96 | 115 |
| 2 | 94 | 112 |
| 5 | 93 | 109 |
| After "make-up": | | |
| 22 | 96 | 112 |
| 26 | 91 | 114 |

The mortars according to Classes A, B and C and those produced with binding agents according to the invention have been tested several times; the values specified are average values.

It is seen from Table 3, that the strength of mortars with the binding agent of the invention in volumetric ratios of 1:5 and 1:4, corresponding to 13.3 and 16.7 parts of binding agent to 100 parts of sand, by weight, is higher than the strength of lime-cement mortar of Class B according to BABS, and that the strength of mortars of the invention in the volumetric ratio of 1:6, corresponding to 11.1 parts of binding agent to 100 parts of sand, by weight, is also higher than that of Class-C mortar according to BABS.

The mortars of Table 3 and two mortars with the same content of binding agent according to the invention as in the lime-cement mortars according to Classes A and B have been tested, where applicable, according to the methods described in the "Murcementnormer" referred to, and the following values were obtained:

TABLE 4

| Mortar | Class | Parts of binding agent to 100 parts of sand | Compressive strength in kp./cm.$^2$ Age in days | | | | Tensile bending strength in kp./cm.$^2$ Age in days | | | |
|---|---|---|---|---|---|---|---|---|---|---|
| | | | 7 | 14 | 28 | 56 | 7 | 14 | 28 | 56 |
| Lime-cement mortar | A | 23.1 | 207 | 243 | 222 | 320 | 41 | 52 | 44 | 57 |
| | B | 18.9 | 87 | 117 | 136 | 182 | 28 | 33 | 43 | 44 |
| | C | 16.7 | 49 | 68 | 69 | 114 | 16 | 20 | 19 | 32 |
| | | 13.3 | 40 | 49 | 55 | 93 | 12 | 15 | 17 | 26 |
| Mortar with the novel binding agent | | 22.2 | 99 | 146 | 163 | 210 | 33 | 48 | 50 | |
| | | 23.1 | 128 | 170 | 196 | 217 | 37 | 41 | 48 | 48 |
| | | 18.9 | 102 | 155 | 176 | 206 | 35 | 45 | 41 | 46 |
| | | 16.7 | 107 | 147 | 174 | 206 | 32 | 36 | 47 | 54 |
| | | 13.3 | 56 | 88 | 107 | 123 | 22 | 31 | 23 | 31 |
| | | 11.1 | 47 | 77 | 92 | 102 | 18 | 25 | 28 | 33 |

These tests, too, verify the fact that the novel binding agent results in mortars having very high strength values.

At the National Physical Laboratory of Sweden the following values were obtained in testing columns built up with the use of binding agents according to the invention, as compared to mortars according to BABS.

TABLE 5

| Mortar | Parts of binding agent to 100 parts of sand | Compressive strength in kp./cm.² after 56 days |
|---|---|---|
| Binding agent according to BABS: | | |
| Class C | 16.7 | 95.1 |
| Class B | 18.9 | 112.7 |
| Binding agent according to the invention: | | |
| Mortar freshly produced | 16.7 | 128.7 |
| Mortar stored during 24 hr | 16.7 | 119.1 |

The test results obtained at the National Laboratory thus give the same picture of the strength characteristics as the test results according to Table 3.

I claim:
1. A method of producing a binding agent, particularly for masonry and finishing mortars, and comprising a mixture of ground blast furnace slag and slaked lime, characterized by
   (a) separately grinding the blast furnace slag to a particle size having a surface area of at least 4,000 cm.²/g.,
   (b) admixing the ground blast furnace slag with slaked lime having a grain size such that the surface area is at least 12,000 cm.²/g., and
   (c) subjecting the admixture of step (b) to a further grinding operation,
the amount of the slaked lime being present in an amount between 10% and 70% by weight of the binding agent.

2. A method according to claim 1 wherein in step (a) the blast furnace slag is ground to a particle size having a surface area of at least 6,000 cm.²/g.

3. A method according to claim 1 wherein about 3–5% by weight of finely pulverized gypsum is added to the binding agent.

4. A method according to claim 2 wherein the amount of blast furnace slag and the amount of slaked lime are about equal, and the binding agent contains about 3–5% by weight of finely pulverized gypsum.

References Cited

UNITED STATES PATENTS

| | | |
|---|---|---|
| 375,599 | 12/1887 | Bosse et al. |
| 1,834,799 | 12/1931 | Nickel et al. |
| 2,663,646 | 12/1953 | Huntzicker et al. |
| 2,663,647 | 12/1953 | Huntzicker et al. |
| 2,947,643 | 8/1960 | Kamlet. |
| 2,967,780 | 1/1961 | Schneiter et al. |
| 3,202,522 | 8/1965 | Yang et al. |

JAMES E. POER, Primary Examiner

U.S. Cl. X.R.

106—118